A. Chase,
Tanners' Tool,

N° 42,165. Patented Apr. 5, 1864.

Witnesses.
J. W. Hanson
Peter C. Green

Inventor,
Amos Chase

UNITED STATES PATENT OFFICE.

AMOS CHASE, OF WEARE, NEW HAMPSHIRE.

IMPROVEMENT IN CURRIERS, ARM OR GRAIN BOARDS.

Specification forming part of Letters Patent No. 42,165, dated April 5, 1864.

*To all whom it may concern:*

Be it known that I, AMOS CHASE, of Weare, in the county of Hillsborough, in the State of New Hampshire, have invented a new and useful Improvement on Curriers, Arm or Grain Boards; and I do hereby declare that the following is a full, clear, and exact description of the construction and operation of the same, reference being had to the annexed drawings, making a part of this specification.

Figure 1:
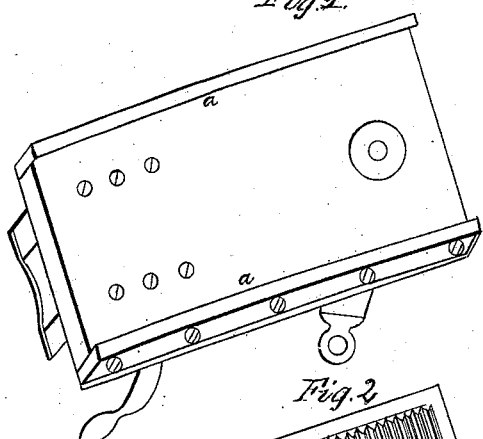
Figure 2:
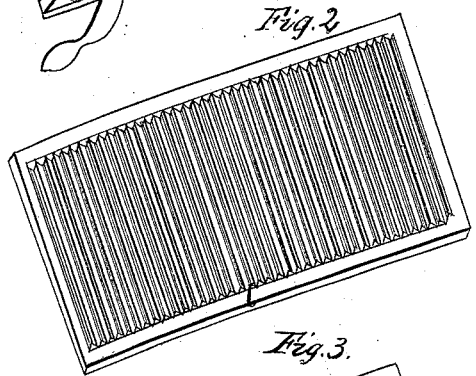
Figure 3:
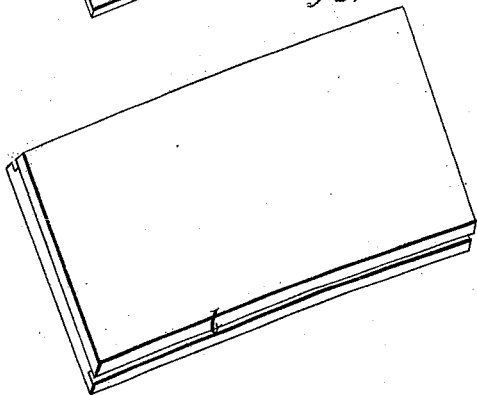

Figure 1 is a perspective view of the improved grain-board with the detached faces, Figs. 2 and 3, removed.

A is a metallic strip, with a flange turned so as to make a groove, into which the detached surfaces are made to slide, and by which they are held firmly and securely in place and yet can readily be removed and replaced by others when they become worn, or when it is desirable to use a surface of different material—as Fig. 2, which is made of grooved wood, might be changed for Fig. 3, which is constructed of cork; also, one end of the common board becomes worn so as to be worthless, while the other remains as good as new. By this improvement the working-surfaces can be removed, the ends changed, when the board becomes as good as new. The groove $b$ in the detached faces, Figs. 2 and 3, is made to pass under and to fit onto the flanges $a$, in Fig. 1. By this arrangement any number of the detached faces can be applied to one board, thus making a great saving of expense to the consumer. He can also get double the amount of wear out of each surface.

I do not claim the invention of any part of a curriers' grain or arm board excepting what is above described.

Having thus described the nature of my improvement, what I claim as my invention, and desire to secure by Letters Patent, is—

1. The construction of curriers' grain-boards with detached faces.

2. The flanges $a$ $a$, Fig. 1, the grooves $b$, Figs. 2 and 3.

AMOS CHASE.

Witnesses:
    C. W. STANLEY,
    GEO. W. MORRILL.